United States Patent
Wang et al.

(10) Patent No.: US 10,009,922 B2
(45) Date of Patent: Jun. 26, 2018

(54) CHANNEL FRAME STRUCTURES FOR HIGH EFFICIENCY WIRELESS LAN (HEW)

(71) Applicant: Marvell World Trade LTD., St. Michael (BB)

(72) Inventors: Lei Wang, San Diego, CA (US); Liwen Chu, San Ramon, CA (US); Yakun Sun, Sunnyvale, CA (US); Hongyuan Zhang, Fremont, CA (US); Jinjing Jiang, San Jose, CA (US); Mingguang Xu, San Jose, CA (US); Hui-Ling Lou, Sunnyvale, CA (US)

(73) Assignee: MARVELL WORLD TRADE LTD., St. Michaels (BB)

( * ) Notice: Subject to any disclaimer, the term of this patent is extended or adjusted under 35 U.S.C. 154(b) by 294 days.

(21) Appl. No.: 14/795,233

(22) Filed: Jul. 9, 2015

(65) Prior Publication Data

US 2016/0021682 A1    Jan. 21, 2016

Related U.S. Application Data

(60) Provisional application No. 62/024,822, filed on Jul. 15, 2014.

(51) Int. Cl.
*H04W 74/04* (2009.01)
*H04W 28/02* (2009.01)
(Continued)

(52) U.S. Cl.
CPC ........... *H04W 74/04* (2013.01); *H04L 5/0098* (2013.01); *H04W 28/0289* (2013.01);
(Continued)

(58) Field of Classification Search
None
See application file for complete search history.

(56) References Cited

U.S. PATENT DOCUMENTS

2010/0260138 A1* 10/2010 Liu ........................ H04L 5/0023
370/330
2013/0235911 A1* 9/2013 Geirhofer ............ H04B 7/0417
375/219
(Continued)

FOREIGN PATENT DOCUMENTS

WO    WO-2014014094 A1    1/2014

OTHER PUBLICATIONS

"Specification of the Bluetooth System" Master Table of Contents & Compliance Requirments—Covered Core Package version: 4.0; Jun. 30, 2010; 2302 Pages.
(Continued)

*Primary Examiner* — Suk Jin Kang

(57) ABSTRACT

An high efficiency wireless local area network access point including a channel access module and a scheduling module. The channel access module accesses a channel of an unlicensed frequency band, which includes a plurality of subchannels. The scheduling module generates a schedule for a plurality of high efficiency wireless local area network client stations to transmit data to the access point via the channel of the unlicensed frequency band. The schedule includes information for the plurality of client stations regarding (i) a time slot in which to access the channel without contention to transmit data to the access point via the channel, (ii) a subchannel of the plurality of subchannels to use during the time slot to transmit data to the access point, and (iii) one or more spatial streams to use on the subchannel and during the time slot to transmit data to the access point.

16 Claims, 11 Drawing Sheets

(51) Int. Cl.
    *H04W 40/24*   (2009.01)
    *H04L 5/00*    (2006.01)
    *H04W 72/12*   (2009.01)
    *H04W 88/08*   (2009.01)
    *H04W 88/02*   (2009.01)
    *H04W 84/02*   (2009.01)
    *H04W 84/12*   (2009.01)

(52) U.S. Cl.
    CPC ..... *H04W 40/244* (2013.01); *H04W 72/1289* (2013.01); *H04W 84/02* (2013.01); *H04W 84/12* (2013.01); *H04W 88/02* (2013.01); *H04W 88/08* (2013.01)

(56) References Cited

U.S. PATENT DOCUMENTS

| | | | | |
|---|---|---|---|---|
| 2015/0009894 | A1* | 1/2015 | Vermani | H04L 1/0072 370/328 |
| 2015/0009917 | A1* | 1/2015 | Cho | H04W 74/0875 370/329 |
| 2015/0139090 | A1* | 5/2015 | Stephens | H04W 52/241 370/329 |
| 2015/0139091 | A1* | 5/2015 | Azizi | H04L 5/003 370/329 |
| 2015/0139119 | A1* | 5/2015 | Azizi | H04W 72/1278 370/329 |
| 2015/0139206 | A1* | 5/2015 | Azizi | H04L 5/003 370/338 |
| 2015/0172012 | A1* | 6/2015 | Abeysekera | H04J 1/00 370/329 |
| 2015/0381512 | A1* | 12/2015 | Park | H04W 72/12 370/445 |
| 2016/0007325 | A1* | 1/2016 | Seok | H04B 7/0452 370/329 |
| 2016/0007342 | A1* | 1/2016 | Seok | H04B 7/0452 370/338 |
| 2016/0088602 | A1* | 3/2016 | Seok | H04L 5/0055 370/338 |
| 2016/0128024 | A1* | 5/2016 | Frederiks | H04W 72/04 370/329 |
| 2016/0227572 | A1* | 8/2016 | Li | H04W 72/1289 |
| 2016/0242173 | A1* | 8/2016 | Li | H04L 5/0023 |
| 2016/0242205 | A1* | 8/2016 | Chen | H04L 27/2614 |
| 2016/0301451 | A1* | 10/2016 | Seok | H04W 56/00 |
| 2016/0338106 | A1* | 11/2016 | Liu | H04W 74/0816 |
| 2017/0041952 | A1* | 2/2017 | Kim | H04W 74/08 |
| 2017/0105229 | A1* | 4/2017 | Luo | H04W 72/121 |
| 2017/0111091 | A1* | 4/2017 | Cao | H04B 7/0452 |
| 2017/0111154 | A1* | 4/2017 | Azizi | H04L 5/0053 |
| 2017/0135035 | A1* | 5/2017 | Azizi | H04W 52/0206 |
| 2017/0170937 | A1* | 6/2017 | Chun | H04L 5/0048 |
| 2017/0171878 | A1* | 6/2017 | Chun | H04W 72/1268 |

OTHER PUBLICATIONS

IEEE 802.16; IEEE Standard for Local and Metropolitan area networks; Part 16: Air Interface for Broadband Wireless Access Systems; IEEE Computer Society and IEEE Microwave Theory and Techniques Society; May 29, 2009; 2082 Pages.

IEEE 802.20; IEEE Standard for Local and Metropolitan Area Networks; Part 20: Air Interface for Mobile Broadband Wireless Access Systems Supporting Vehicular Mobility—Physical and Media Access Control Layer Specification: IEEE Computer Society; Aug. 29, 2008; 1053 Pages.

IEEE P802.11—REVmc/D3.0; IEEE Standard for Information technology—Telecommunications and information exchange between systems; Local and metropolitan area networks—Specific requirements—Part 11: Wireless LAN Medium Access Control (MAC) and Physical Layer (PHY) Specifications; Jun. 2014; 3701 pages.

IEEE P802.11ac™/D5.0; Draft Standard for Information Technology—Telecommunications and information exchange between systems—Local and metropolitan area networks—Specific requirements: Part 11: Wireless LAN Medium Access Control (MAC) and Physical Layer (PHY) specifications: Amendment 4: Enhancements for Very High Throughput for Operation in Bands below 6 GHz; Jan. 2013; 440 Pages.

IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 Pages.

IEEE P802.11ax; Selection Procedure Draft Standard IEEE 802.11-014/0938-03-00ax, Jul. 2014; IEEE 082.11-14/0980r6 IEEE P802.11 Wireless LANs, Jul. 2014; 11ax Evaluation Methodology, Jan. 15, 2015; IEEE 802.11ax Channel Model Document IEEE 802.11-14/0882r4, Sep. 16, 2014; Proposed 802.11ax Functional Requirements, May 2014; Specification Framework for TGax IEEE 802.11-15/0132r2, Jan. 2015; Total pp. 117.

IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; Apr. 2003, 69 Pages.

IEEE 802.11n: TGn Sync Proposal Technical Specifications; Syed Aon Mujtaba; IEEE 802.11-04/0889r6; May 2005; 131 pages.

IEEE Std 802.11a-1999 (Supplement to IEEE Std 802.11-1999) Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: High-Speed Physical Layer in the 5 Ghz Band; LAN/MAN Standards Committee of the IEEE Computer Society; Sep. 16, 1999; 91 pages.

IEEE Std. 802.11-2012; IEEE Standard for Information technology—Telecommunications and information exchange between systems Local and metropolitan area networks—Specific requirements; Part 11: Wireless Lan Medium Access Control (MAC) and Physical Layer (PHY) Specifications; IEEE Computer Society; Sponsored by the LAN/MAN Standards Committee; Mar. 29, 2012; 2793 pages.

IEEE Std. 802.11b; Supplement to IEEE Standard for Information technolgy—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; Sep. 16, 1999; 96 Pages.

IEEE Std. P802.11ad/D5.0; Draft Standard for information technology—Telecommunications and information exchange between systems Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band; Sep. 2011; 601 Pages.

Chun, Jinyoung, et al. "Consideration on UL MU Transmission"; IEEE 11-14/0802r0; Jul. 14, 2014.

Inoue, Yasuhiko, et al. "Discussions on the Better Resource Utilization for the Next Generation WLANs"; IEEE 802.1-12/0068r1; Jan. 17, 2012.

International Search Report for PCT/ US/2015/040110 dated Oct. 16, 2015.

Lou, Hanqing, et al. "Multi-User Parallel Channel Access for High Efficiency Carrier Grade Wireless LANs" IEEE ICC 2014—Selected Areas in Communications Symposium; pp. 3865-3870; Jun. 10, 2014.

Nguyen, Tran Thi Thao, et al. "Uplink Multi-User MAC Protocol for 11ax"; IEEE 11-14/0598r0; May 11, 2015.

Wang, Xiaofei, et al. "Carrier Grade Wi-Fi: Air Interface Requirements and Technologies"; IEEE Long Island Systems Applications and Technology (LISAT) Conference 21014; pp. 1-6; May 2, 2014.

Written Opinion for PCT/ US/2015/040110 dated Oct. 16, 2015.

\* cited by examiner

CHANNEL FRAME STRUCTURES FOR HIGH EFFICIENCY WIRELESS LAN (HEW)

CROSS-REFERENCE TO RELATED APPLICATIONS

This application claims the benefit of U.S. Provisional Application No. 62/024,822, filed on Jul. 15, 2014. The entire disclosure of the application referenced above is incorporated herein by reference.

FIELD

The present disclosure relates generally to wireless communications and more particularly to channel frame structures for High Efficiency Wireless local area network (HEW).

BACKGROUND

The Institute of Electrical and Electronics Engineers (IEEE) is developing standards to regulate communications in High Efficiency Wireless local area network (HEW). For example, the IEEE802.11ax standard is being designed to regulate aspects of communications between HEW access points (HEW APs) and HEW client stations (HEW STAs), including, for example, channel access by HEW APs and HEW STAs, frame exchanges between HEW APs and HEW STAs, and so on. APs and STAs compliant with the IEEE802.11ax standard are generally referred to as HEW APs and HEW STAs throughout the present disclosure.

SUMMARY

An access point comprises a channel access module and a scheduling module. The channel access module is configured to access a channel of an unlicensed frequency band. The channel of the unlicensed frequency band includes a plurality of subchannels. The scheduling module is configured to generate a schedule for a plurality of client stations to transmit data to the access point via the channel of the unlicensed frequency band. The schedule includes information for the plurality of client stations regarding (i) a time slot in which to access the channel without contention to transmit data to the access point via the channel of the unlicensed frequency band, (ii) a subchannel of the plurality of subchannels of the unlicensed frequency band to use during the time slot to transmit data to the access point, and (iii) one or more spatial streams to use on the subchannel and during the time slot to transmit data to the access point. The access point includes a high efficiency wireless local area network access point configured to communicate with the plurality of client stations in a wireless local area network operating in the unlicensed band. The plurality of client stations includes high efficiency wireless local area network client stations configured to communicate with the access point in the wireless local area network in the unlicensed band in accordance with the schedule.

A method comprises accessing a channel of an unlicensed frequency band, where the channel of the unlicensed frequency band includes a plurality of subchannels; and generating a schedule for a plurality of client stations to transmit data to an access point via the channel of the unlicensed frequency band. The schedule includes information for the plurality of client stations regarding (i) a time slot in which to access the channel without contention to transmit data to the access point via the channel of the unlicensed frequency band, (ii) a subchannel of the plurality of subchannels of the unlicensed frequency band to use during the time slot to transmit data to the access point, and (iii) one or more spatial streams to use on the subchannel and during the time slot to transmit data to the access point. The access point includes a high efficiency wireless local area network access point configured to communicate with the plurality of client stations in a wireless local area network operating in the unlicensed band. the plurality of client stations includes high efficiency wireless local area network client stations configured to communicate with the access point in the wireless local area network in the unlicensed band in accordance with the schedule.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

The present disclosure relates to scheduling uplink transmissions from multiple HEW STAs to a HEW AP operating in an unlicensed frequency band. Specifically, the HEW AP accesses the medium using a contention-based channel access mechanism (e.g., carrier sense multiple access with collision avoidance (CSMA/CA)). The HEW AP allocates time slots and subchannels of a channel of the unlicensed frequency band in which the HEW STAs transmit data to the HEW AP. The HEW STAs access the medium during the allocated time slots without contention and transmit data to the HEW AP using the allocated subchannels during the allocated time slots. If a basic service set (BSS) of the HEW AP additionally includes legacy stations that do not support the IEEE 802.11ax standard and that access the medium with contention, the scheduled channel access and transmissions of the HEW STAs provide the legacy stations with fair opportunities to access the medium and transmit data to the HEW AP in the unlicensed frequency band. The legacy STAs experience reduced contention when attempting to access the medium since the HEW STAs access the channel on a scheduled basis. A legacy station (or legacy STA) is a station that communicates in accordance with communication protocols (e.g., IEEE 802.11a, IEEE 802.11n, and/or IEEE 802.11ac) having a lower data throughput than the communication protocol (e.g., IEEE 802.11ax) associated with a HEW station. The present disclosure also specifies frame exchange sequences (FESs) when the BSS includes only the HEW AP and the HEW STAs (Greenfield mode) and when the BSS additionally includes legacy STAs (mixed mode). These and other features of the present disclosure are described below in detail.

Figure 1:
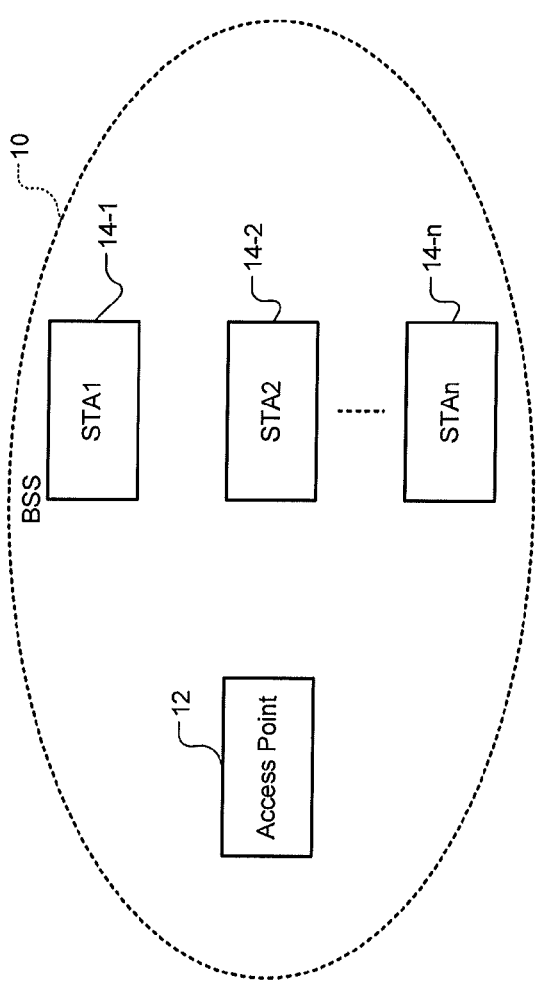
FIG. 1 depicts a basic service set (BSS) including an access point (AP) and a plurality of client stations (STAs).

FIG. 1 shows a basic service set (BSS) 10. The BSS 10 includes an access point (AP) 12. Additionally, the BSS 10 includes a plurality of client stations STA1 14-1, STA2 14-2, . . . , and STAn 14-n, where n is an integer greater than one (collectively STAs 14). The BSS 10 can be part of a high-efficiency wireless local area network (HEW). The AP 12 includes a HEW AP compliant with the IEEE 802.11ax standard. The STAs 14 include HEW STAs compliant with the IEEE 802.11ax standard. One or more, but not all, of the STAs 14 may include legacy STAs that are not compliant with the IEEE 802.11ax standard.

Figure 2:
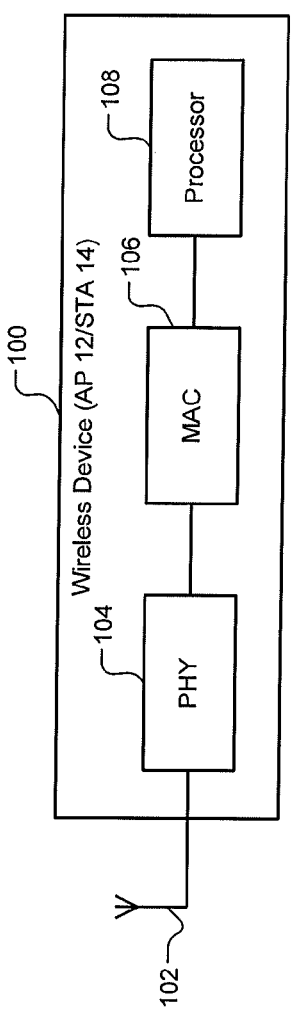
FIG. 2 is a block diagram of a wireless device (e.g., the AP or the STA of FIG. 1).

FIG. 2 shows a wireless device 100 (e.g., the AP 12 or the STA 14) including an antenna 102, a physical layer (PHY) 104, a medium access controller (MAC) 106, and a processor 108. While a single antenna 102 is shown, the wireless device 100 may include a plurality of antennas. For example, the plurality of antennas may be arranged in a multiple-input multiple-output (MIMO) configuration. The PHY 104 interfaces the wireless device 100 with the medium via the antenna 102. The MAC 106 controls access by the wireless device 100 to the medium. The processor 108 processes packets that are received and that are to be transmitted via the antenna 102.

Figure 3:
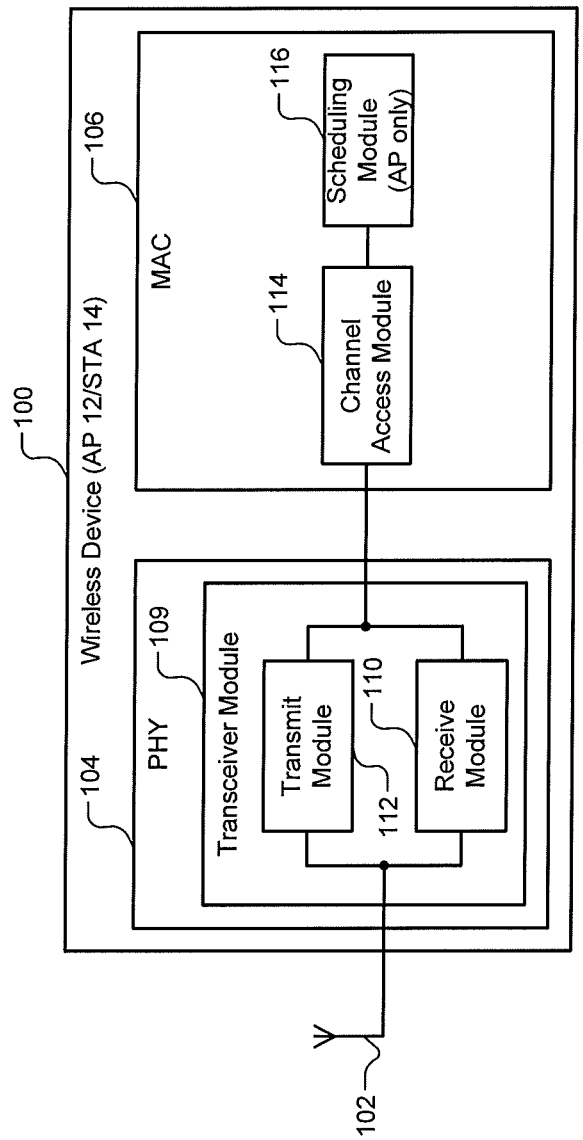
FIG. 3 is a detailed block diagram of the wireless device of FIG. 2.

FIG. 3 shows the wireless device 100 (e.g., the AP 12 or the STA 14) in further detail. The PHY 104 includes a transceiver module 109. The transceiver module 109 includes a receive module 110 and a transmit module 112. The receive module 110 receives packets via the antenna 102. The transmit module 112 transmits packets via the antenna 102. The MAC 106 includes a channel access module 114 and a scheduling module 116 when the wireless device 100 is implemented as an AP (i.e., as the AP 12). The MAC 106 includes the channel access module 114 and does not include the scheduling module 116 when the wireless device 100 is implemented as a STA (i.e., as the STA 14). In some implementations, one or more modules of the PHY 104 may be included in the MAC 106 while one or more modules of the MAC 106 may be included in the PHY 104.

The modules of the wireless device 100 perform operations described below for both an AP and a STA (i.e., regardless of whether the wireless device 100 is implemented as the AP 12 or the STA 14) except where the description of a module specifically states that the module performs the described operations only for an AP (i.e., only when the wireless device 100 is implemented as the AP 12) or only for a STA (i.e., only when the wireless device 100 is implemented as the STA 14). As the following description clarifies, some modules (e.g., the scheduling module 116) may perform some operations (e.g., scheduling uplink transmissions of the STAs 14) only in an AP (i.e., only when the wireless device 100 is implemented as the AP 12) and not in a STA, and therefore may be included only in the AP 12 and not in the STA 14.

The detailed operations of the various modules of the wireless device 100 shown in FIG. 3 are described below with references to FIGS. 3 and 8-12. Before describing the detailed operations of these modules, the channel frame structure and channel access mechanisms according to the IEEE 802.11 standard are described below with references to FIGS. 4-7.

Figure 4:
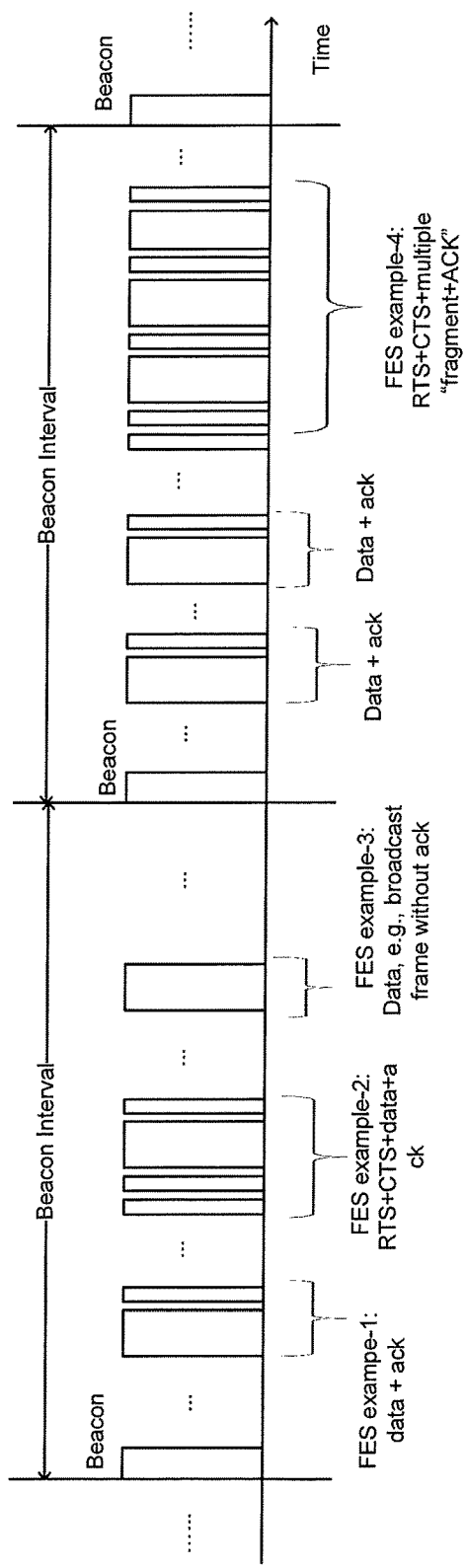
FIG. 4 depicts a channel frame structure according to IEEE 802.11 standard.

FIG. 4 shows the channel frame structure according to the IEEE 802.11 standard, including a layout and compositions of frames transmitted on a channel by an AP and a STA with Radio Access Technology (RAT). The channel frame structure includes a plurality of frame exchange sequences (FESs) between an AP and a STA within a beacon interval. The channel frame structure is based on factors including PHY designs (e.g., PPDU format, where PPDU denotes PLCP protocol data unit, and PLCP denotes physical layer convergence protocol); channel access mechanisms (e.g., CSMA/CA, time division multiple access (TDMA), OFDMA, and so on); frame exchange sequences (FESs) (e.g., including combinations of different frames such as Data+Ack; RTS+CTS+Data+ACK; and so on, where RTS denotes ready-to-send, CTS denotes clear-to-send, and ACK denotes acknowledgement); and system information provisioning (e.g., beacon transmissions).

An FES includes one or more frames. For example, as shown in FIG. 4, a first FES may include a data/management frame and an ACK frame; a second FES may include a data/management frame (e.g., a beacon frame); a third FES may include a RTS frame, a CTS frame, a Data/management frame, and an ACK frame; and so on. If an FES includes multiple frames, the frames are separated by a short inter frame space (SIFS). FIG. 4 shows only some examples of FESs, and FESs including additional combinations of different frames are possible.

Each frame is a PHY PPDU and has a PHY-dependent PPDU format (e.g., see PPDU formats specified in IEEE 802.11 standards including IEEE 802.11ac, 11n, 11g, 11b, 11a, and so on. An FES is initiated by a STA that gains channel access based on channel access mechanisms specified in the IEEE 802.11 standard. All devices, including AP and non-AP STAs, and associated STAs and non-associated STAs, are allowed to gain access to the channel to initiate a FES. The system information is provisioned by a beacon frame, which is periodically transmitted; and/or a probe response frame transmitted upon receiving a request in a probe request frame.

Figure 5:
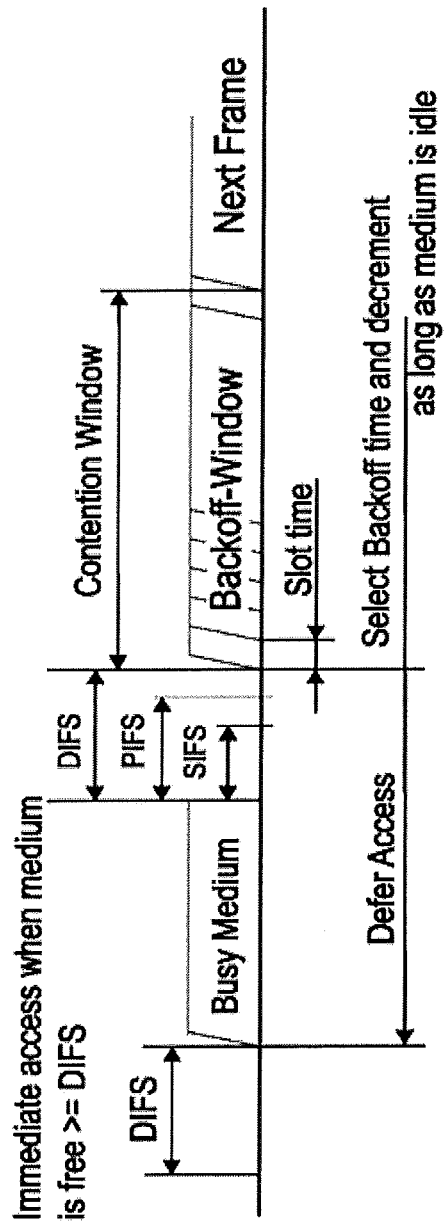
FIGS. 5 and 6 depict channel access methods according to the IEEE 802.11 standard.
Figure 6:
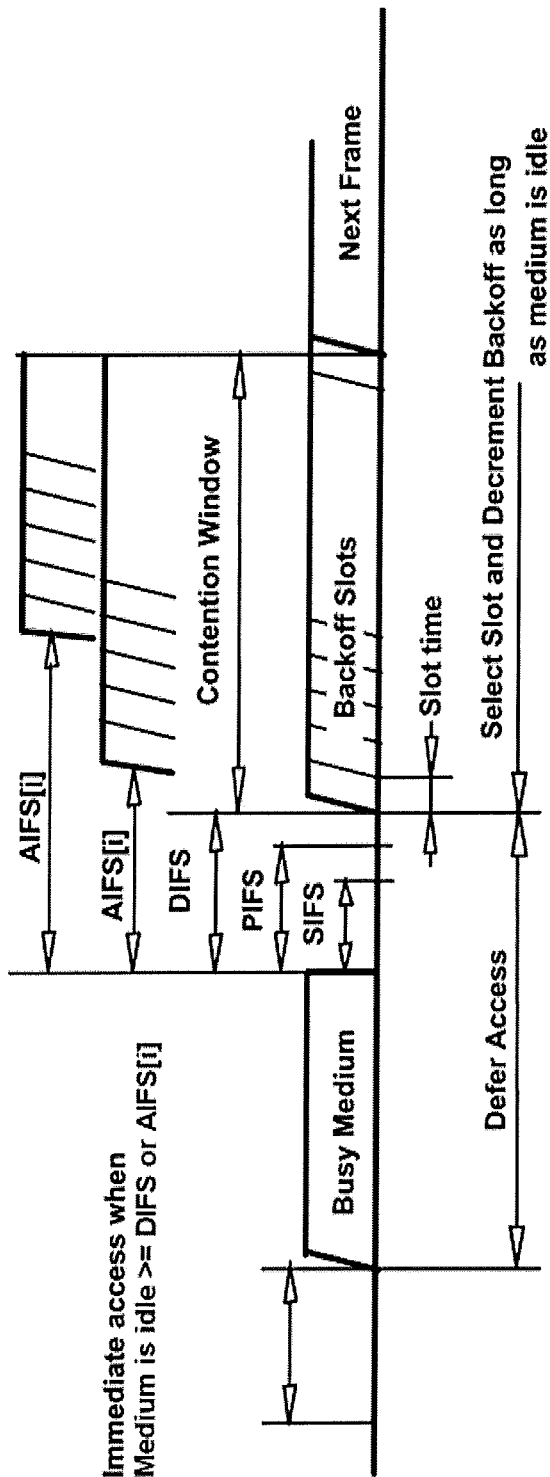
Figure 7:
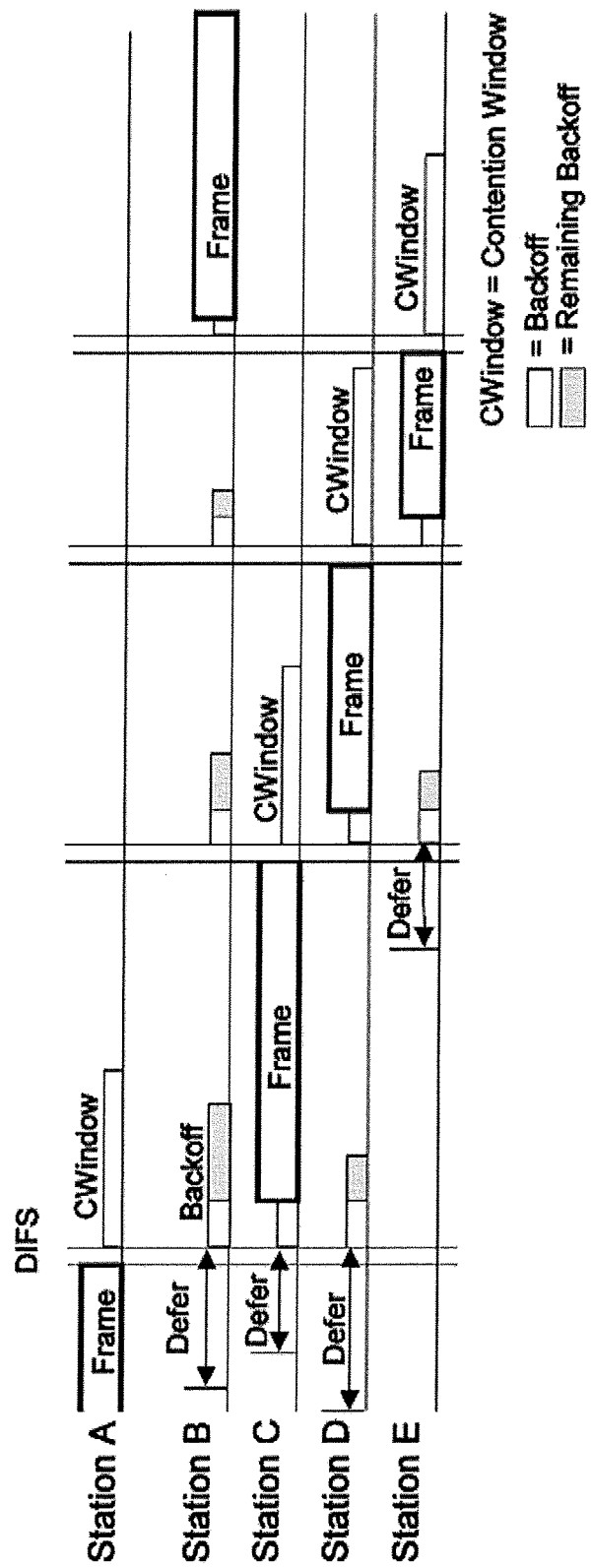
FIG. 7 depicts a backoff procedure according to the IEEE 802.11 standard.

FIGS. 5-7 show channel access methods and backoff procedures performed by an AP or a STA. In FIGS. 5 and 6, when a device (e.g., an AP or a STA) wants to transmit data, the device listens to the channel. If the channel is busy, the device backs off and waits until the channel is idle. The device gains access to the channel when the channel is idle and transmits the data. In FIGS. 5 and 6, SIFS denotes short inter frame space; PIFS denotes point coordination function (PCF) inter frame space; DIFS denotes distributed coordination function (DCF) inter frame space; and AIFS denotes arbitration inter frame space. FIG. 7 shows a backoff procedure performed by the device.

One of the channel access mechanisms specified by the IEEE 802.11 standard is CSMA/CA. With CSMA/CA, different inter-frame spaces (IFSs) are used to provide different channel access priorities. There are two carrier sense (CS) mechanisms: physical CS that is PHY specific and is based on PHY clear channel access (CCA) indication, and virtual CS based on network allocation vector (NAV) settings.

The IEEE 802.11ax standard is targeted to improve the efficiency of the IEEE 802.11 Wireless LAN systems, where different technologies with multi-user (MU) simultaneous transmissions are considered (e.g., downlink (DL) OFDMA, uplink (UL) OFDMA, UL MU MIMO, and DL MU MIMO (supported in 802.11ac)). To support UL MU simultaneous transmissions in general, high synchronization in both time and frequency is desirable. To schedule UL MU transmissions, STAs need to know in advance when and which subchannels/spatial streams to use to transmit data. However, ownership of the channel is not guaranteed in unlicensed frequency bands.

The following scheduling mechanisms and frame exchange sequences (FESs) facilitate UL MU simultaneous transmissions in unlicensed frequency bands. The scheduling mechanisms and frame exchange sequences (FESs) provide fair channel access opportunities to legacy stations operating in a basic service set comprising HEW APs and STAs compliant with the IEEE 802.11ax standard. FIGS. 8-11 show channel frame structures that include the scheduling mechanisms and FESs that facilitate UL MU simultaneous transmissions in unlicensed frequency bands. These FESs are hereinafter generally referred to as IEEE 802.11ax FESs or simply as 11ax FESs. FIGS. 8-11 are described below with references to FIGS. 1-3.

Figure 8:
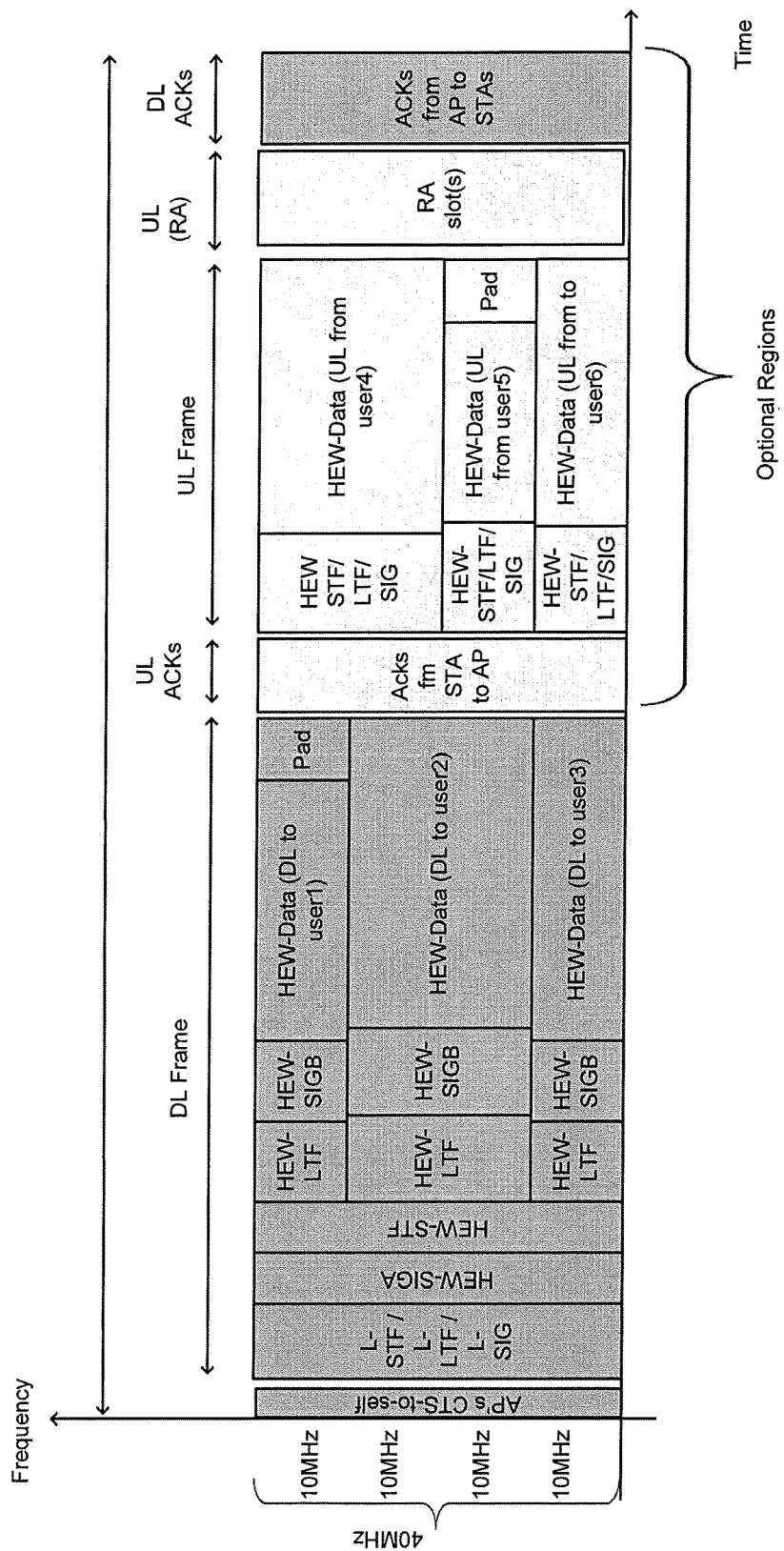
FIG. 8 depicts a channel frame structure including a frame exchange sequence (FES) for transmitting a schedule for uplink multiuser transmissions in an unlicensed frequency band.

FIG. 8 shows an example of the channel frame structure including an FES used for UL MU transmissions in an unlicensed frequency band. Only an AP (e.g., the AP 12) can initiate an 11ax FES. STAs are not allowed to initiate any 11ax FESs. When an AP needs to initiate an 11ax FES, the AP uses a channel access mechanism (e.g., CSMA/CA) to gain access to a channel of the unlicensed frequency band. For example, in FIG. 3, the channel access module 114 of the AP 12 uses a channel access mechanism (e.g., CSMA/CA) to gain access to a channel of the unlicensed frequency band. The channel of the unlicensed frequency band includes a plurality of subchannels.

In a BSS supporting devices compliant with the IEEE 802.11ax standard (e.g., the BSS 10 comprising the HEW AP 12 and the HEW STAs 14 as shown in FIG. 1), the STAs (e.g., the HEW STAs 14) are discouraged or even disallowed to use CSMA/CA to access the channel. Instead, the HEW STAs 14 are encouraged and allowed to use the allocations provided by the HEW AP 12 to access the channel. For example, in FIG. 3, the scheduling module 116 of the HEW AP 12 generates a schedule for the HEW STAs 14 to transmit data to the HEW AP 12 via the channel of the unlicensed frequency band. The schedule includes information for the HEW STAs 14 regarding (i) a time slot in which to access the channel without contention to transmit data to the HEW AP 12 via the channel of the unlicensed frequency band and (ii) a subchannel of the plurality of subcarriers of the unlicensed frequency band to use during the time slot to transmit data to the HEW AP 12. The transmit module 112 of the HEW AP 12 transmits the schedule to the HEW STAs 14 via the channel of the unlicensed frequency band. The receive module 110 of the HEW AP 12 receives data from the HEW STAs 14 in accordance with the schedule via the channel of the unlicensed frequency band.

Before associating with the BSS 10, the HEW STA 14 uses random access (RA) slots to initiate communication with the HEW AP 12. The random access slots are UL channel access opportunities allocated to the HEW STAs 14 to access the channel in a contention-based manner (i.e., these allocations of the RA slots are not unicast UL allocations). For example, in FIG. 3, the scheduling module of the HEW AP 12 allocates the random access slots to the HEW STAs 14 to access the channel in the unlicensed frequency band with contention before the HEW STAs 14 are associated with the HEW AP 12. The receive module 110 of the HEW AP 12 receives data from the HEW STAs 14 in the allocated random access slots via the channel of the unlicensed frequency band before the HEW STAs 14 are associated with the HEW AP 12.

After the HEW STAs are associated with the BSS 10, the HEW STA 14 (e.g., the channel access module 114 of the HEW STA 14) normally uses the allocated unicast UL allocations (i.e., the allocated time slots and subchannels) in the schedule to access the channel, unless it has to use the random access slots for some timely needs. The receive module 110 of the HEW AP 12 receives data from the HEW STAs 14 in accordance with the schedule via the channel of the unlicensed frequency band after the HEW STAs 14 are associated with the HEW AP 12.

In FIG. 8, the 11ax FES includes a mandatory portion, i.e., a DL frame; zero, one, or more optional regions, e.g., DL CTS-to-self; UL ACKs (from STA to AP); a UL frame, random access (RA) slots; and DL ACKs (from AP to STAs). Except DL CTS-to-self, the presence of all other optional regions is indicated in the DL frame. Additionally, the DL frame may include broadcast, multicast, and/or unicast data or management or control information transmitted from the HEW AP 12 to the HEW STAs 14.

The composition of the FES, except for the DL CTS-to-self, is broadcast via HEW SIG field(s) or a broadcast subframe at the beginning of the DL frame. Accordingly, the HEW STAs 14 know which portion of the DL frame to receive and decode; which portion of the UL frame (if present) to transmit; which portion of the UL ACK region (if present) to send ACKs; whether or not there are RA slots to use; and which portion of the DL ACKs (if present) to receive and decode.

If present, the UL ACK region and UL data region includes the unicast allocations (i.e., the radio link resources are allocated to specific HEW STAs 14 to transmit data to the HEW AP 12) in a non-contention-based manner (i.e., without contention to access the channel). If present, the RA region includes random access (RA) slots for the HEW STAs 14 for transmitting short UL frames to the HEW AP 12 in a contention-based manner (e.g., for the HEW STAs 14 that do not have unicast UL allocations, e.g., a new HEW STA 14 joining the BSS 10, or a HEW STA 14 that was inactive in UL traffic for a while, and so on). If present, the UL ACKs can also be included in an UL frame. Accordingly, there may not be a separate UL ACK region in an 11ax FES.

If present, the DL ACK region includes ACKs to the UL transmissions in the UL frame and in the RA region. The DL ACKs can also be included in a DL frame of next 11ax Fes. Accordingly, there may not be a separate DL ACK region in an 11ax FES.

Further, an 11ax FES includes 11ax frames in the formats of 11ax DL PPDUs, which support simultaneous DL transmissions to multi-users in both frequency-domain (OFDMA) and in spatial-domain (MIMO). For example, consider frequency-domain multi-user transmissions using OFDMA. The DL frame may include DL-subframes, where each DL-subframe is transmitted in a pre-allocated set of sub-channels; each DL-subframe includes its own HEW-LTF and HEW-SIGB fields (i.e., the SIG fields after LTF), data, and an optional PAD; and different DL sub-frames may be sent to different HEW STAs 14. Similarly, the UL frame may include UL-subframes transmitted by different HEW STAs 14 on pre-allocated set of sub-channels and in the pre-allocated time slots, with HEW training and signal fields, data, and PAD (if needed). The UL ACK region includes multiple UL ACK transmission opportunities allocated to multiple HEW STAs 14 to transmit ACKs in a subchannelized manner. The RA region OFDMA may include multiple random access opportunities in a subchannelized manner. The DL ACK region may include multiple DL ACK frames transmitted in a subchannel manner, or one broadcast/multicast DL frame aggregated with multiple ACK frames. The DL CTS-to-Self may be transmitted as duplicate PPDUs in multiple subchannels, or one PPDU in entire channel. The gaps between DL frame and optional regions is less than DIFS so that the channel is kept occupied for the entire duration of the EFS.

Accordingly, in FIG. 3, the transmit module 112 of the HEW AP 12 transmits a DL frame in the channel of the unlicensed frequency band. The downlink frame includes control information for the HEW STAs 14. The control information indicates to the HEW STAs 14 one or more of (i) which portion of the DL frame to receive and decode, (ii) when and in which subchannel to transmit an UL ACK to the HEW AP 12, (iii) when and in which subchannel to transmit an UL frame to the HEW AP 12, (iv) random access slot allocation, and (v) which portion of a DL ACK to receive and decode. Further, the DL frame transmitted by the transmit module 112 of the HEW AP 12 includes a plurality of DL subframes. The transmit module 112 of the HEW AP 12 transmits each DL subframe in a pre-allocated set of subchannels of the unlicensed frequency band. Each DL subframe includes HEW training fields (e.g., HEW-STF and HEW-LTF), HEW signal fields (e.g., HEW-SIGA and HEW-SIGB), and data. The receive module 110 of the HEW AP 12 receives an UL frame transmitted from the HEW STAs 14 in accordance with the schedule via the channel of the unlicensed frequency band. The UL frame includes a plurality of UL subframes transmitted by the HEW STAs 14 via a pre-allocated set of subchannels in pre-allocated time slots in accordance with the schedule. Each UL subframe includes HEW training and signal fields (e.g., HEW-STF, HEW-LTF, HEW-SIG), and data.

Figure 9:
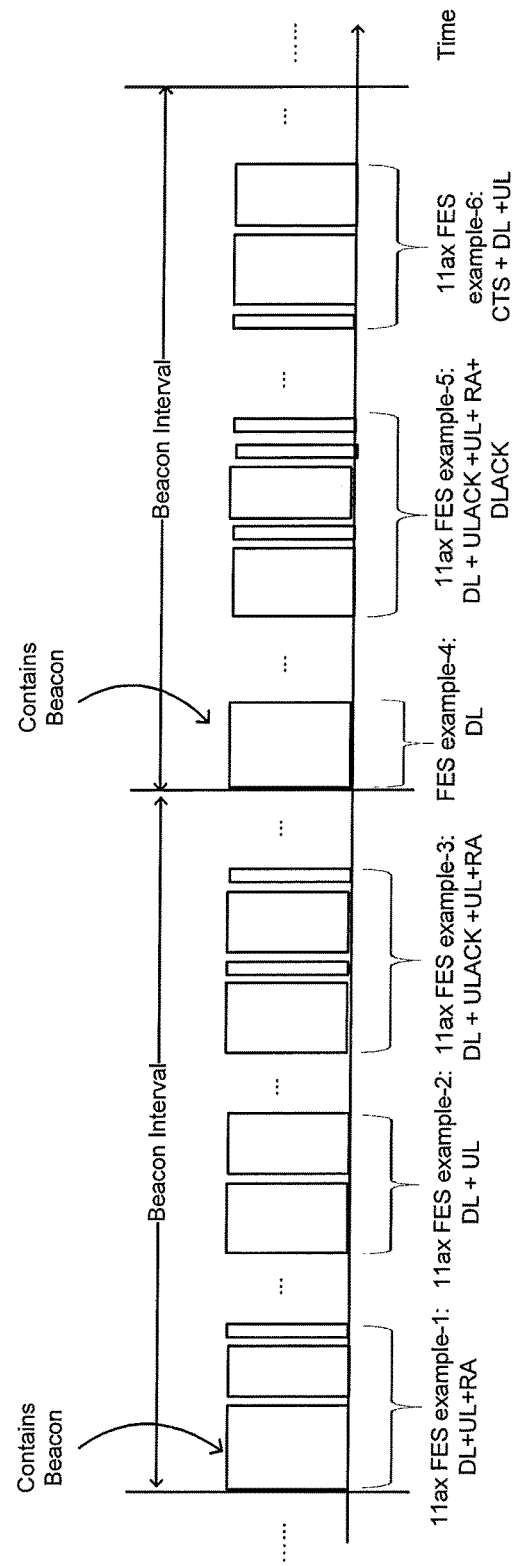
FIG. 9 depicts frame exchange sequences (FESs) for a basic service set (BSS) operating in Greenfield mode (i.e., when the BSS includes only HEW AP and HEW STAs and does not include any legacy STAs).

FIG. 9 shows FESs for a BSS operating in Greenfield mode (i.e., when the BSS 10 includes only the HEW AP 12 and HEW STAs 14 and does not include any legacy STAs). In the BSS operating in Greenfield mode, the beacon frame can be included in the 11ax DL frame of an 11ax FES during a beacon interval. The HEW STAs 14 use the allocations provided by the HEW AP 12 to access the channel in the unlicensed frequency band. Only the HEW AP 12 can initiate 11ax FESs by using CSMA/CA to gain the access to the channel in the unlicensed frequency band. Alternatively, the AP can occupy the channel for multiple EFSs by using an inter-frame space smaller than DIFS between consecutive FESs or by setting a NAV sufficiently long.

Figure 10:
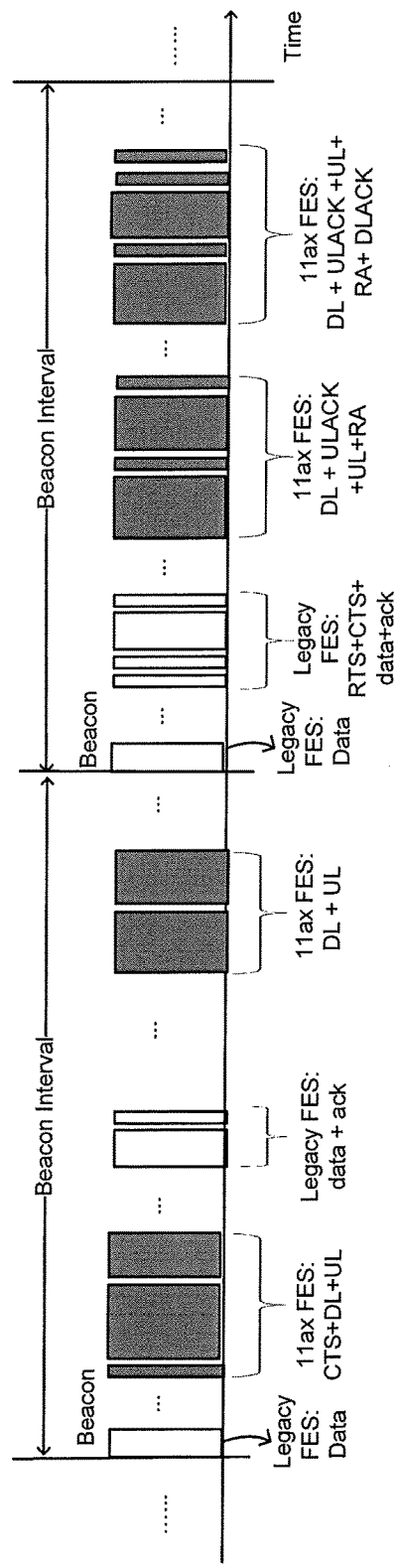
FIG. 10 depicts frame exchange sequences (FESs) for a BSS operating in a mixed mode (i.e., when the BSS includes HEW AP, HEW STAs, and at least one legacy STA).

FIG. 10 shows FESs for a BSS operating in mixed mode (i.e., when the BSS 10 includes the HEW AP 12, and the STAs 14 include HEW STAs and at least one legacy STA). In the BSS operating in mixed mode, the beacon frame is transmitted in a legacy beacon frame exchange sequence during a beacon interval. The HEW STAs 14 use the allocations provided by the HEW AP 12 in 11ax FESs to access the channel in the unlicensed frequency band. The legacy STAs use CSMA/CA to access the channel in the unlicensed frequency band. The HEW AP 12 uses CSMA/CA to access the channel, to initiate either an 11ax FES or a legacy FES. Both 11ax FESs and legacy FESs can appear in the channel. The HEW AP 12 and legacy STAs can use CSMA/CA to gain the access to the channel to initiate legacy FESs, while the HEW STAs 14 are discouraged or disallowed to use CSMA/CA to initiate legacy FESs. Consequently, legacy STAs experience reduced contention.

Accordingly, in FIG. 3, when the BSS 10 does not include any legacy STAs and includes only the HEW AP 12 and the HEW STAs 14 (i.e., when the BSS 10 operates in Greenfield mode), the FESs initiated by the HEW AP 12 are as shown in FIG. 9. The transmit module 112 of the HEW AP 12 transmits a beacon frame in a DL frame of a FES via the channel of the unlicensed frequency band. The transceiver module 109 of the HEW AP 12 transmits and receives one or more FESs via the channel of the unlicensed frequency band during a beacon interval. The one or more FESs may include one or more FESs shown in FIG. 9. For example, the one or more FESs may include one or more of (i) a first FES including a DL frame, an UL frame, and a random access slot; (ii) a second FES including a DL frame and an UL frame; (iii) a third FES including a DL frame, an UL ACK frame, an UL frame, and a random access slot; (iv) a fourth FES including a DL frame; (v) a fifth FES including a DL frame, an UL ACK frame, an UL frame, a random access slot, and a DL ACK frame; and (vi) a sixth FES including a CTS frame, a DL frame, and an UL frame.

When the BSS 10 includes at least one legacy STA in addition to the HEW AP 12 and the HEW STAs 14 (i.e., when the BSS 10 operates in mixed mode), the FESs are as shown in FIG. 10. The transmit module 112 of the HEW AP 12 transmits a beacon frame in a legacy beacon frame of a legacy FES via the channel of the unlicensed frequency band. The legacy STAs access the channel of the unlicensed frequency band with contention. For example, the channel access module 114 of a legacy STA 14 accesses the channel of the unlicensed frequency band with contention. The HEW STAs 14 access the channel of the unlicensed frequency band without contention in accordance with the schedule received from the HEW AP 12. For example, the channel access module 114 of a HEW STA 14 accesses the channel of the unlicensed frequency band without contention in accordance with the schedule received from the HEW AP 12.

Further, the transceiver module 109 of the HEW AP 12 transmits and receives one or more FESs via the channel of the unlicensed frequency band during a beacon interval. The one or more FESs may include one or more FESs shown in FIG. 10. For example, the one or more FESs include a first legacy FES including a legacy beacon frame transmitted at the beginning of the beacon interval followed by one or more of the following FESs: a second legacy FES to exchange data between the HEW AP 12 and one or more legacy STAs; and a third FES to exchange data between the HEW AP 12 and the HEW STAs 14. The second legacy FES may include one or more of (i) a data frame and an ACK frame; and (ii) a RTS frame, a CTS frame, a data frame, and an ACK frame. The third FES may include one or more of (i) a CTS frame, a DL frame, and an UL frame; (ii) a DL frame and an UL frame; (iii) a DL frame, an UL ACK frame, an UL frame, and a random access slot; and (iv) a DL frame, an UL ACK frame, an UL frame, a random access slot, and a DL ACK frame.

Figure 11:
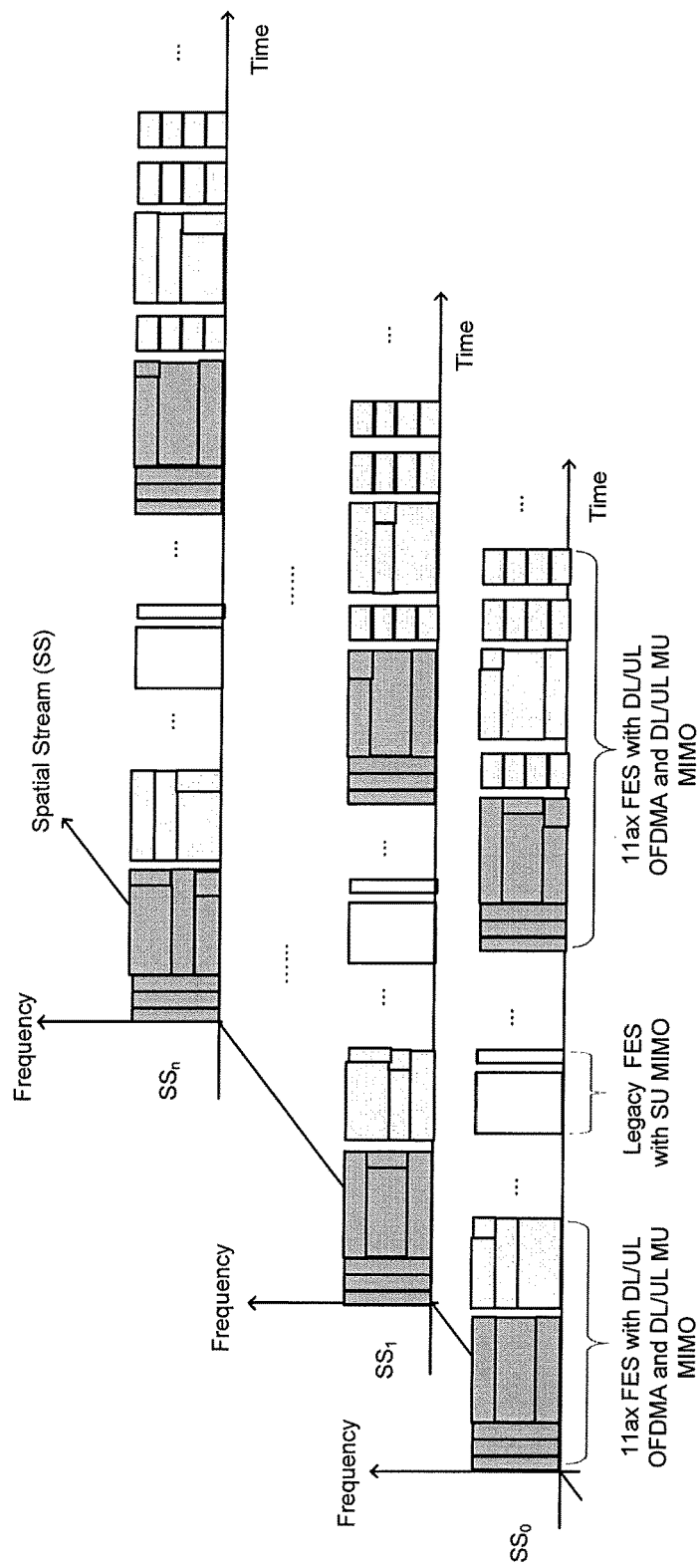
FIG. 11 depicts a channel frame structure with orthogonal frequency division multiple access (OFDMA) and multiuser multiple-input multiple-output (MU MIMO).

FIG. 11 shows a channel frame structure with OFDMA and MU MIMO. An 11ax FES can be initiated by the HEW AP 12 only, with synchronized DL and UL in both frequency domain and spatial domain. Different spatial streams can have different user groups, and different subchannels can be assigned to different users. In mixed mode, the legacy FESs can be initiated by legacy STAs or AP, which may use multiple spatial streams with SU MIMO or DL MU MIMO.

Accordingly, in FIG. 3, the transceiver module 109 of the HEW AP 12 exchanges data with the STAs 14 via a plurality of data streams in the unlicensed frequency band. The plurality of data streams is transmitted and received by the transceiver module 109 of the HEW AP 12 via a plurality of antennas arranged in a MIMO configuration. Different data streams of the plurality of data streams correspond to respective STAs 14. The scheduling module 116 of the HEW AP 12 assigns different subchannels of the unlicensed frequency band and different spatial streams to the respective HEW STAs 14.

Figure 12:
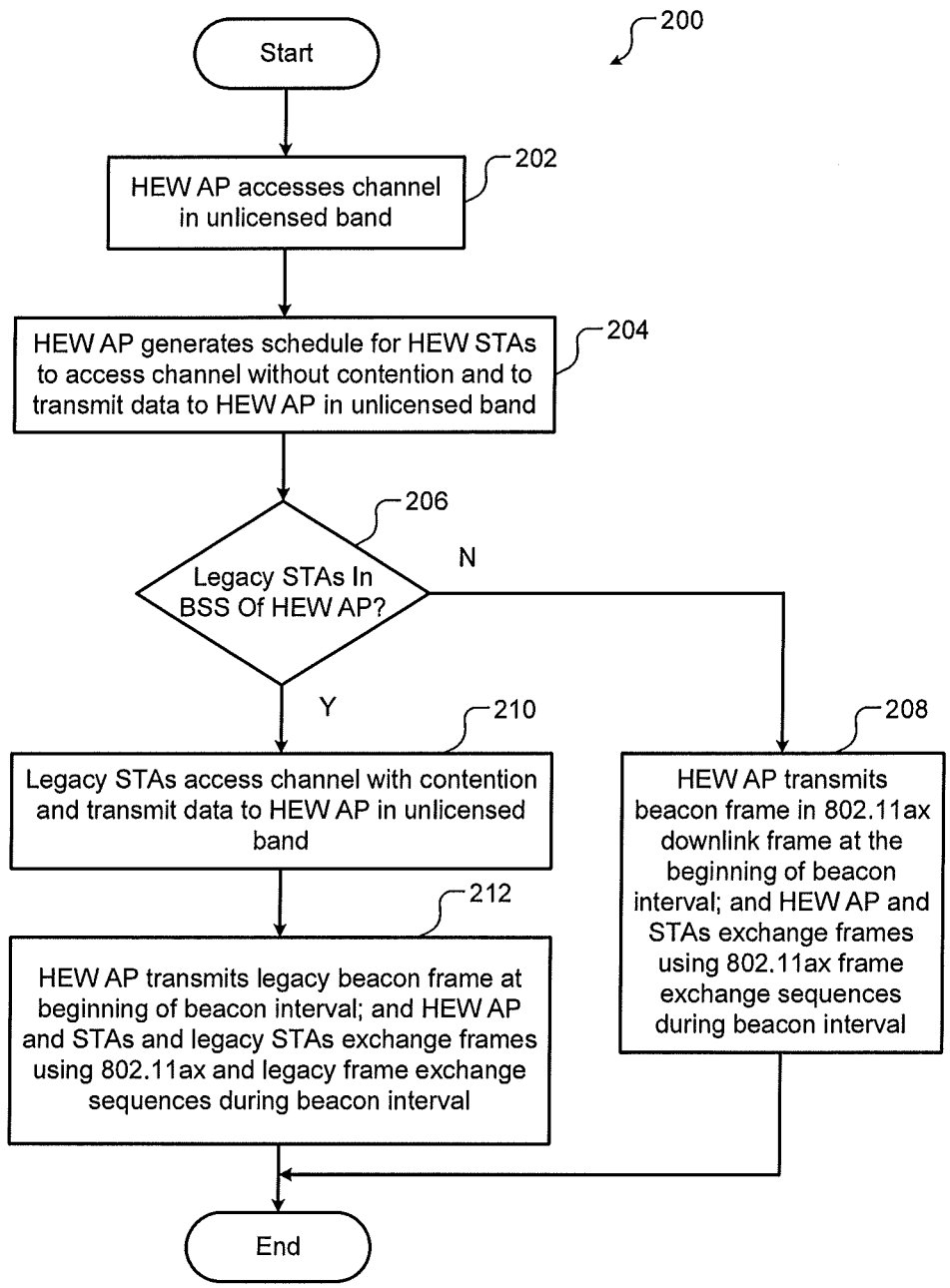
FIG. 12 is a flowchart of a method for scheduling uplink transmissions from multiple HEW STAs to a HEW AP operating in an unlicensed frequency band, and for transmitting and receiving FESs when a BSS operates in Greenfield mode and a mixed mode.

FIG. 12 shows a method 200 for scheduling uplink transmissions from multiple HEW STAs to a HEW AP operating in an unlicensed frequency band and for transmitting and receiving frame exchange sequences (FESs) when a BSS includes only the HEW AP and the HEW STAs (Greenfield mode) and when the BSS additionally includes legacy STAs (mixed mode). At 202, the HEW AP accesses channel in the unlicensed frequency band in a contention-based manner. At 204, the HEW AP generates a schedule for the HEW STAs to access the channel without contention and to transmit data to the HEW AP in the unlicensed frequency band. At 206, the HEW AP determines whether the BSS includes any legacy STAs. At 208, if the BSS does not include any legacy STAs, the HEW AP transmits a beacon frame in the IEEE 802.11ax downlink frame at the beginning of a beacon interval, and the HEW AP and the HEW STAs exchange frames using IEEE 802.11ax FESs during the beacon interval. At 210, if the BSS includes any legacy STAs in addition to the HEW STAs, the legacy STAs access the channel with contention and transmit data to the HEW AP in the unlicensed frequency band. At 212, the HEW AP transmits a legacy beacon frame at the beginning of a beacon interval, and the HEW AP and STAs and the legacy STAs exchange frames using IEEE 802.11ax and legacy FESs during the beacon interval.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

Further aspects of the present invention relate to one or more of the following clauses.

An access point comprises a channel access module and a scheduling module. The channel access module is configured to access a channel of an unlicensed frequency band. The channel of the unlicensed frequency band includes a plurality of subchannels. The scheduling module is configured to generate a schedule for a plurality of client stations to transmit data to the access point via the channel of the unlicensed frequency band. The schedule includes information for the plurality of client stations regarding (i) a time slot in which to access the channel without contention to transmit data to the access point via the channel of the unlicensed frequency band, (ii) a subchannel of the plurality of subchannels of the unlicensed frequency band to use during the time slot to transmit data to the access point, and (iii) one or more spatial streams to use on the subchannel and during the time slot to transmit data to the access point. The access point includes a high efficiency wireless local area network access point configured to communicate with the plurality of client stations in a wireless local area network operating in the unlicensed band. The plurality of client stations includes high efficiency wireless local area network client stations configured to communicate with the access point in the wireless local area network in the unlicensed band in accordance with the schedule.

In other features, the access point further comprises a transmit module and a receive module. The transmit module is configured to transmit the schedule to the plurality of client stations via the channel of the unlicensed frequency band. The receive module is configured to receive data transmitted from the plurality of client stations via the channel of the unlicensed frequency band without contention in accordance with the schedule subsequent to the plurality of client stations being associated with the access point.

In another feature, the access point further comprises a receive module configured to receive data from the plurality of client stations via one or more random access slots in the unlicensed frequency band prior to the plurality of client stations being associated with the access point. The scheduling module is configured to allocate the random access slots to the plurality of client stations to access the channel in the unlicensed frequency band with contention prior to being associated with the access point.

In another feature, the access point further comprises a transmit module configured to transmit a downlink frame in the channel of the unlicensed frequency band. The downlink frame includes control information for the plurality of client stations. The control information indicates to the plurality of client stations one or more of (i) which portion of the downlink frame to receive and decode, (ii) when and in which subchannel to transmit an uplink acknowledgement to the access point, (iii) when and in which subchannel to transmit an uplink frame to the access point, (iv) random access slot allocation, and (v) which portion of a downlink acknowledgement to receive and decode.

In another feature, the access point further comprises a transmit module configured to transmit a downlink frame via the channel of the unlicensed frequency band. The downlink frame includes a plurality of downlink subframes. Each downlink subframe is transmitted in a pre-allocated set of subchannels of the unlicensed frequency band. Each downlink subframe includes high efficiency wireless local area network training and signal fields and data.

In another feature, the access point further comprises a receive module configured to receive an uplink frame transmitted from the plurality of client stations in accordance with the schedule via the channel of the unlicensed frequency band. The uplink frame includes a plurality of uplink subframes transmitted by the plurality of client stations via a pre-allocated set of subchannels in pre-allocated time slots in accordance with the schedule. Each uplink subframe includes high efficiency wireless local area network training and signal fields and data.

In another feature, the access point further comprises a transmit module configured to transmit via the channel of the unlicensed frequency band, in response to the high efficiency wireless local area network not including a legacy client station, a beacon frame included in a downlink frame of a frame exchange sequence. The frame exchange sequence is used to exchange data between the access point and the plurality of client stations configured to communicate in the high efficiency wireless local area network.

In another feature, the access point further comprises a transceiver module configured to transmit and receive one or more frame exchange sequences via the channel of the unlicensed frequency band during a beacon interval. In response to the high efficiency wireless local area network not including a legacy client station, the one or more frame exchange sequences include one or more of (i) a first frame exchange sequence including a downlink frame, an uplink frame, and a random access slot; (ii) a second frame exchange sequence including a downlink frame and an uplink frame; (iii) a third frame exchange sequence including a downlink frame, an uplink acknowledgment frame, an uplink frame, and a random access slot; (iv) a fourth frame exchange sequence including a downlink frame; (v) a fifth frame exchange sequence including a downlink frame, an uplink acknowledgment frame, an uplink frame, a random access slot, and a downlink acknowledgment frame; and (vi) a sixth frame exchange sequence including a clear-to-send frame, a downlink frame, and an uplink frame.

In another feature, the access point further comprises a transmit module configured to transmit via the channel of the unlicensed frequency band, in response to the high efficiency wireless local area network including one or more legacy client stations, a beacon frame included in a legacy beacon frame of a legacy frame exchange sequence. The one or more legacy client stations are configured to access the channel of the unlicensed frequency band with contention. The plurality of client stations is configured to access the channel of the unlicensed frequency band in accordance with the schedule without contention.

In another feature, the access point further comprises a transceiver module configured to transmit and receive one or more frame exchange sequences via the channel of the unlicensed frequency band during a beacon interval. In response to the high efficiency wireless local area network including one or more legacy client stations, the one or more frame exchange sequences include a first legacy frame exchange sequence including a legacy beacon frame transmitted at the beginning of the beacon interval followed by one or more of (i) a second legacy frame exchange sequence to exchange data between the access point and the one or more legacy client stations; and (ii) a third frame exchange sequence to exchange data between the access point and the plurality of client stations capable of communicating in the high efficiency wireless local area network. The second legacy frame exchange sequence includes one or more of (i) a data frame and an acknowledgement frame; and (ii) a ready-to-send frame, a clear-to-send frame, a data frame, and an acknowledgement frame. The third frame exchange sequence includes one or more of (i) a clear-to-send frame, a downlink frame, and an uplink frame; (ii) a downlink frame and an uplink frame; (iii) a downlink frame, an uplink acknowledgment frame, an uplink frame, and a random access slot; and (iv) a downlink frame, an uplink acknowledgment frame, an uplink frame, a random access slot, and a downlink acknowledgment frame.

In another feature, the access point further comprises a transceiver module configured to exchange data with the plurality of client stations via a plurality of data streams in the unlicensed frequency band. The plurality of data streams is transmitted and received by the transceiver module via a plurality of antennas arranged in a multiple-input multiple output configuration. Different data streams of the plurality of data streams correspond to respective client stations of the plurality of client stations. The scheduling module is configured to assign subchannels of the unlicensed frequency band and data streams of the plurality of data streams to the respective client stations of the plurality of client stations.

In still other features, a method comprises accessing a channel of an unlicensed frequency band, where the channel of the unlicensed frequency band includes a plurality of subchannels; and generating a schedule for a plurality of client stations to transmit data to an access point via the channel of the unlicensed frequency band. The schedule includes information for the plurality of client stations regarding (i) a time slot in which to access the channel without contention to transmit data to the access point via the channel of the unlicensed frequency band, (ii) a subchannel of the plurality of subchannels of the unlicensed frequency band to use during the time slot to transmit data to the access point, and (iii) one or more spatial streams to use on the subchannel and during the time slot to transmit data to the access point. The access point includes a high efficiency wireless local area network access point configured to communicate with the plurality of client stations in a wireless local area network operating in the unlicensed band. the plurality of client stations includes high efficiency wireless local area network client stations configured to communicate with the access point in the wireless local area network in the unlicensed band in accordance with the schedule.

In other features, the method further comprises transmitting the schedule to the plurality of client stations via the channel of the unlicensed frequency band, and receiving data transmitted from the plurality of client stations via the channel of the unlicensed frequency band without contention in accordance with the schedule subsequent to the plurality of client stations being associated with the access point.

In other features, the method further comprises allocating random access slots to the plurality of client stations to access the channel in the unlicensed frequency band with contention prior to being associated with the access point, and receiving data from the plurality of client stations via one or more of the random access slots in the unlicensed frequency band prior to the plurality of client stations being associated with the access point.

In other features, the method further comprises generating a downlink frame including control information for the plurality of client stations, and transmitting the downlink frame in the channel of the unlicensed frequency band. The control information indicates to the plurality of client stations one or more of (i) which portion of the downlink frame to receive and decode, (ii) when and in which subchannel to transmit an uplink acknowledgement to the access point, (iii) when and in which subchannel to transmit an uplink frame to the access point, (iv) random access slot allocation, and (v) which portion of a downlink acknowledgement to receive and decode.

In other features, the method further comprises generating a downlink frame including a plurality of downlink subframes, and transmitting the downlink frame via the channel of the unlicensed frequency band by transmitting each downlink subframe in a pre-allocated set of subchannels of the unlicensed frequency band. Each downlink subframe includes high efficiency wireless local area network training and signal fields and data.

In another feature, the method further comprises receiving an uplink frame transmitted from the plurality of client stations in accordance with the schedule via the channel of the unlicensed frequency band. The uplink frame includes a plurality of uplink subframes. Each uplink subframe includes high efficiency wireless local area network training and signal fields and data. The plurality of uplink subframes is transmitted by the plurality of client stations via a pre-allocated set of subchannels in pre-allocated time slots in accordance with the schedule.

In other features, the method further comprises transmitting, via the channel of the unlicensed frequency band, in response to the high efficiency wireless local area network not including a legacy client station, a beacon frame included in a downlink frame of a frame exchange sequence; and using the frame exchange sequence to exchange data between the access point and the plurality of client stations configured to communicate in the high efficiency wireless local area network.

In another feature, the method further comprises transmitting and receiving one or more frame exchange sequences via the channel of the unlicensed frequency band during a beacon interval. In response to the high efficiency wireless local area network not including a legacy client station, the one or more frame exchange sequences include one or more of (i) a first frame exchange sequence including a downlink frame, an uplink frame, and a random access slot; (ii) a second frame exchange sequence including a downlink frame and an uplink frame; (iii) a third frame exchange sequence including a downlink frame, an uplink acknowledgment frame, an uplink frame, and a random access slot; (iv) a fourth frame exchange sequence including a downlink frame; (v) a fifth frame exchange sequence including a downlink frame, an uplink acknowledgment frame, an uplink frame, a random access slot, and a downlink acknowledgment frame; and (vi) a sixth frame exchange sequence including a clear-to-send frame, a downlink frame, and an uplink frame.

In another feature, the method further comprises transmitting, via the channel of the unlicensed frequency band, in response to the high efficiency wireless local area network including one or more legacy client stations, a beacon frame included in a legacy beacon frame of a legacy frame exchange sequence. The one or more legacy client stations are configured to access the channel of the unlicensed frequency band with contention. The plurality of client stations is configured to access the channel of the unlicensed frequency band in accordance with the schedule without contention.

In another feature, the method further comprises transmitting and receiving one or more frame exchange sequences via the channel of the unlicensed frequency band during a beacon interval. In response to the high efficiency wireless local area network including one or more legacy client stations, the one or more frame exchange sequences include a first legacy frame exchange sequence including a legacy beacon frame transmitted at the beginning of the beacon interval followed by one or more of (i) a second legacy frame exchange sequence to exchange data between the access point and the one or more legacy client stations; and (ii) a third frame exchange sequence to exchange data between the access point and the plurality of client stations capable of communicating in the high efficiency wireless local area network. The second legacy frame exchange sequence includes one or more of (i) a data frame and an acknowledgement frame; and (ii) a ready-to-send frame, a clear-to-send frame, a data frame, and an acknowledgement frame. The third frame exchange sequence includes one or more of (i) a clear-to-send frame, a downlink frame, and an uplink frame; (ii) a downlink frame and an uplink frame; (iii) a downlink frame, an uplink acknowledgment frame, an uplink frame, and a random access slot; and (iv) a downlink frame, an uplink acknowledgment frame, an uplink frame, a random access slot, and a downlink acknowledgment frame.

In another feature, the method further comprises exchanging data with the plurality of client stations via a plurality of data streams in the unlicensed frequency band by (i) transmitting and receiving the plurality of data streams via a plurality of antennas arranged in a multiple-input multiple output configuration, wherein different data streams of the plurality of data streams correspond to respective client stations of the plurality of client stations; and (ii) assigning subchannels of the unlicensed frequency band and data streams of the plurality of data streams to the respective client stations of the plurality of client stations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An access point comprising:
a channel access module configured to access a channel of an unlicensed frequency band, wherein the channel of the unlicensed frequency band includes a plurality of subchannels;
a scheduling module configured to generate a schedule for a plurality of client stations to transmit data to the access point via the channel of the unlicensed frequency band,
wherein the schedule includes information for the plurality of client stations regarding (i) a time slot in which to access the channel without contention to transmit data to the access point via the channel of the unlicensed frequency band, (ii) a subchannel of the plurality of subchannels of the unlicensed frequency band to use during the time slot to transmit data to the access point, and (iii) one or more spatial streams to use on the subchannel and during the time slot to transmit data to the access point,
wherein the access point includes a high efficiency wireless local area network access point configured to communicate with the plurality of client stations in a wireless local area network operating in the unlicensed frequency band, and
wherein the plurality of client stations includes high efficiency wireless local area network client stations configured to communicate with the access point in the wireless local area network in the unlicensed frequency band in accordance with the schedule; and
a transmit module configured to transmit via the channel of the unlicensed frequency band, in response to the high efficiency wireless local area network including one or more legacy client stations, a beacon frame included in a legacy beacon frame of a legacy frame exchange sequence,
wherein the one or more legacy client stations are configured to access the channel of the unlicensed frequency band with contention, and
wherein the plurality of client stations is configured to access the channel of the unlicensed frequency band in accordance with the schedule without contention.

2. The access point of claim 1, wherein:
the transmit module is configured to transmit the schedule to the plurality of client stations via the channel of the unlicensed frequency band,
the access point further comprising a receive module configured to receive data transmitted from the plurality of client stations via the channel of the unlicensed frequency band without contention in accordance with the schedule subsequent to the plurality of client stations being associated with the access point.

3. The access point of claim 1, further comprising:
a receive module configured to receive data from the plurality of client stations via one or more random access slots in the unlicensed frequency band prior to the plurality of client stations being associated with the access point, wherein the scheduling module is configured to allocate the random access slots to the plurality of client stations to access the channel in the unlicensed frequency band with contention prior to being associated with the access point.

4. The access point of claim 1, wherein:
the transmit module is configured to transmit a downlink frame in the channel of the unlicensed frequency band,
the downlink frame includes control information for the plurality of client stations, and
the control information indicates to the plurality of client stations one or more of (i) which portion of the downlink frame to receive and decode, (ii) when and in which subchannel to transmit an uplink acknowledgement to the access point, (iii) when and in which subchannel to transmit an uplink frame to the access point, (iv) random access slot allocation, and (v) which portion of a downlink acknowledgement to receive and decode.

5. The access point of claim 1, wherein:
the transmit module is configured to transmit a downlink frame via the channel of the unlicensed frequency band,
the downlink frame includes a plurality of downlink subframes,
each downlink subframe is transmitted in a pre-allocated set of subchannels of the unlicensed frequency band, and
each downlink subframe includes high efficiency wireless local area network training and signal fields and data.

6. The access point of claim 1, further comprising:
a receive module configured to receive an uplink frame transmitted from the plurality of client stations in accordance with the schedule via the channel of the unlicensed frequency band,
wherein the uplink frame includes a plurality of uplink subframes transmitted by the plurality of client stations via a pre-allocated set of subchannels in pre-allocated time slots in accordance with the schedule, and
wherein each uplink subframe includes high efficiency wireless local area network training and signal fields and data.

7. The access point of claim 1, wherein:
the transmit module is configured to transmit and receive one or more frame exchange sequences via the channel of the unlicensed frequency band during a beacon interval,
the access point further comprising a receive module configured to receive one or more frame exchange sequences via the channel of the unlicensed frequency band during the beacon interval,
wherein, in response to the high efficiency wireless local area network including one or more legacy client stations, the one or more frame exchange sequences include a first legacy frame exchange sequence including a legacy beacon frame transmitted at the beginning of the beacon interval followed by one or more of (i) a second legacy frame exchange sequence to exchange data between the access point and the one or more legacy client stations; and (ii) a third frame exchange sequence to exchange data between the access point and the plurality of client stations capable of communicating in the high efficiency wireless local area network;
wherein the second legacy frame exchange sequence includes one or more of (i) a data frame and an acknowledgement frame; and (ii) a ready-to-send frame, a clear-to-send frame, a data frame, and an acknowledgement frame; and
wherein the third frame exchange sequence includes one or more of (i) a clear-to-send frame, a downlink frame, and an uplink frame; (ii) a downlink frame and an uplink frame; (iii) a downlink frame, an uplink acknowledgment frame, an uplink frame, and a random access slot; and (iv) a downlink frame, an uplink acknowledgment frame, an uplink frame, a random access slot, and a downlink acknowledgment frame.

8. The access point of claim 1, further comprising:
a transceiver module comprising the transmit module and a receive module configured to exchange data with the plurality of client stations via a plurality of data streams in the unlicensed frequency band,
wherein the plurality of data streams is transmitted and received by the transceiver module via a plurality of antennas arranged in a multiple-input multiple output configuration,
wherein different data streams of the plurality of data streams correspond to respective client stations of the plurality of client stations, and
wherein the scheduling module is configured to assign subchannels of the unlicensed frequency band and data streams of the plurality of data streams to the respective client stations of the plurality of client stations.

9. A method comprising:
accessing a channel of an unlicensed frequency band, wherein the channel of the unlicensed frequency band includes a plurality of subchannels;
generating a schedule for a plurality of client stations to transmit data to an access point via the channel of the unlicensed frequency band,
wherein the schedule includes information for the plurality of client stations regarding (i) a time slot in which to access the channel without contention to transmit data to the access point via the channel of the unlicensed frequency band, (ii) a subchannel of the plurality of subchannels of the unlicensed frequency band to use during the time slot to transmit data to the access point, and (iii) one or more spatial streams to use on the subchannel and during the time slot to transmit data to the access point,
wherein the access point includes a high efficiency wireless local area network access point configured to communicate with the plurality of client stations in a wireless local area network operating in the unlicensed frequency band, and
wherein the plurality of client stations includes high efficiency wireless local area network client stations configured to communicate with the access point in the wireless local area network in the unlicensed frequency band in accordance with the schedule; and
transmitting, via the channel of the unlicensed frequency band, in response to the high efficiency wireless local area network including one or more legacy client stations, a beacon frame included in a legacy beacon frame of a legacy frame exchange sequence,
wherein the one or more legacy client stations are configured to access the channel of the unlicensed frequency band with contention, and
wherein the plurality of client stations is configured to access the channel of the unlicensed frequency band in accordance with the schedule without contention.

10. The method of claim 9, further comprising:
transmitting the schedule to the plurality of client stations via the channel of the unlicensed frequency band; and receiving data transmitted from the plurality of client stations via the channel of the unlicensed frequency band without contention in accordance with the schedule subsequent to the plurality of client stations being associated with the access point.

11. The method of claim 9, further comprising:

allocating random access slots to the plurality of client stations to access the channel in the unlicensed frequency band with contention prior to being associated with the access point; and receiving data from the plurality of client stations via one or more of the random access slots in the unlicensed frequency band prior to the plurality of client stations being associated with the access point.

12. The method of claim 9, further comprising:

generating a downlink frame including control information for the plurality of client stations, wherein the control information indicates to the plurality of client stations one or more of (i) which portion of the downlink frame to receive and decode, (ii) when and in which subchannel to transmit an uplink acknowledgement to the access point, (iii) when and in which subchannel to transmit an uplink frame to the access point, (iv) random access slot allocation, and (v) which portion of a downlink acknowledgement to receive and decode; and transmitting the downlink frame in the channel of the unlicensed frequency band.

13. The method of claim 9, further comprising:

generating a downlink frame including a plurality of downlink subframes, wherein each downlink subframe includes high efficiency wireless local area network training and signal fields and data; and transmitting the downlink frame via the channel of the unlicensed frequency band by transmitting each downlink subframe in a pre-allocated set of subchannels of the unlicensed frequency band.

14. The method of claim 9, further comprising:

receiving an uplink frame transmitted from the plurality of client stations in accordance with the schedule via the channel of the unlicensed frequency band, wherein the uplink frame includes a plurality of uplink subframes, wherein each uplink subframe includes high efficiency wireless local area network training and signal fields and data, and wherein the plurality of uplink subframes is transmitted by the plurality of client stations via a pre-allocated set of subchannels in pre-allocated time slots in accordance with the schedule.

15. The method of claim 9, further comprising:

transmitting and receiving one or more frame exchange sequences via the channel of the unlicensed frequency band during a beacon interval, wherein, in response to the high efficiency wireless local area network including one or more legacy client stations, the one or more frame exchange sequences include a first legacy frame exchange sequence including a legacy beacon frame transmitted at the beginning of the beacon interval followed by one or more of (i) a second legacy frame exchange sequence to exchange data between the access point and the one or more legacy client stations; and (ii) a third frame exchange sequence to exchange data between the access point and the plurality of client stations capable of communicating in the high efficiency wireless local area network;

wherein the second legacy frame exchange sequence includes one or more of (i) a data frame and an acknowledgement frame; and (ii) a ready-to-send frame, a clear-to-send frame, a data frame, and an acknowledgement frame; and wherein the third frame exchange sequence includes one or more of (i) a clear-to-send frame, a downlink frame, and an uplink frame; (ii) a downlink frame and an uplink frame; (iii) a downlink frame, an uplink acknowledgment frame, an uplink frame, and a random access slot; and (iv) a downlink frame, an uplink acknowledgment frame, an uplink frame, a random access slot, and a downlink acknowledgment frame.

16. The method of claim 9, further comprising exchanging data with the plurality of client stations via a plurality of data streams in the unlicensed frequency band by:

transmitting and receiving the plurality of data streams via a plurality of antennas arranged in a multiple-input multiple output configuration, wherein different data streams of the plurality of data streams correspond to respective client stations of the plurality of client stations; and assigning subchannels of the unlicensed frequency band and data streams of the plurality of data streams to the respective client stations of the plurality of client stations.

* * * * *